United States Patent
Shetty et al.

(10) Patent No.: US 12,553,700 B2
(45) Date of Patent: Feb. 17, 2026

(54) METHOD AND SYSTEM FOR MONITORING THE FILM THICKNESS OF A LUBRICANT WITHIN A LUBRICATED BEARING

(71) Applicant: Aktiebolaget SKF, Gothenburg (SE)

(72) Inventors: Pramod Shetty, Enschede (NL); Jude Asuelimen Osara, Enschede (NL); Robert Jan Meijer, Delden (NL); Pieter Martin Lugt, Vianen (NL)

(73) Assignee: Aktiebolaget SKF, Gothenburg (SE)

( * ) Notice: Subject to any disclaimer, the term of this patent is extended or adjusted under 35 U.S.C. 154(b) by 471 days.

(21) Appl. No.: 18/102,105

(22) Filed: Jan. 27, 2023

(65) Prior Publication Data

US 2023/0251075 A1 Aug. 10, 2023

(30) Foreign Application Priority Data

Feb. 8, 2022 (DE) .......................... 102022201286.0

(51) Int. Cl.
| | |
|---|---|
| G01B 7/06 | (2006.01) |
| F16C 33/66 | (2006.01) |
| G01M 13/04 | (2019.01) |
| G01N 27/24 | (2006.01) |
| G01N 33/28 | (2006.01) |

(52) U.S. Cl.
CPC ............ *G01B 7/08* (2013.01); *F16C 33/6625* (2013.01); *F16C 33/6633* (2013.01); *G01M 13/04* (2013.01); *G01N 27/24* (2013.01); *F16C 2233/00* (2013.01); *G01N 33/2888* (2013.01)

(58) Field of Classification Search
CPC ... G01N 27/24; G01N 33/2888; G01M 13/04; G01B 7/08; G01B 7/085; G01B 7/044; G01B 7/048; F16C 17/24; F16C 19/06; F16C 19/52; F16C 2233/00; F16C 33/6625; F16C 33/6633
USPC .............. 73/53.05, 114.55–114.56, 10, 19.11
See application file for complete search history.

(56) References Cited

FOREIGN PATENT DOCUMENTS

JP H06241234 A * 8/1994

OTHER PUBLICATIONS

Measuring Film Thickness in Starved Grease-Lubricated Ball Bearings: An Improved Electrical Capacitance Method, Pramod Shetty, Robert Jan Meijer, Jude A. Osara & Piet M. Lugt, Tribology Transactions, ISSN: (Print) (Online) Journal homepage: https://www.tandfonline.com/loi/utrb20, Taylor & Francis, Taylor & Francis Group.

* cited by examiner

*Primary Examiner* — John E Breene
*Assistant Examiner* — Truong D Phan
(74) *Attorney, Agent, or Firm* — The Garcia-Zamor Law Firm; Ruy Garcia-Zamor

(57) ABSTRACT

Disclosed is a monitoring method for monitoring the film thickness of a lubricant within a lubricated bearing, the bearing having an inner ring, an outer ring and rolling elements being arranged between the inner ring and the outer ring. The monitoring method comprises a capacitance measuring step for measuring the total capacitance of the bearing; a first calculation step for determining a film thickness of the lubricant based on the measured capacitance of the bearing and for determining whether the lubrication condition is fully flooded or starved, and when the lubrication condition is fully flooded, a second calculation step for correcting the film thickness determined in the first calculation step.

12 Claims, 3 Drawing Sheets

METHOD AND SYSTEM FOR MONITORING THE FILM THICKNESS OF A LUBRICANT WITHIN A LUBRICATED BEARING

CROSS-REFERENCE TO RELATED APPLICATIONS

This application claims priority to German Patent Application no. 102022201286.0, filed Feb. 8, 2022, the contents of which is fully incorporated herein by reference.

TECHNICAL OF THE INVENTION

The present invention relates to a method for monitoring the film thickness of a lubricant within a lubricated bearing. The present invention further relates to a system for monitoring the film thickness of a lubricant within a lubricated bearing.

BACKGROUND

In bearings, in particular rolling bearings, the thickness of the lubricating film between rolling elements and rings of the bearings determines the quality of lubrication and therefore the bearing life. For oil lubricated bearings, the film thickness can be calculated. There exist several theories and equations for that. For grease lubricated bearings, until now, there exist no such calculation approach.

However, monitoring the film thickness is also important for grease lubricated bearings. This is in particular the case as grease ages in the bearings (the grease itself has a finite life which is usually much shorter than the fatigue life of the bearing) and monitoring the grease, and its film thickness, may allow to timely exchange or refill the grease within the bearing.

The methodology that is used for oil lubricated bearings cannot be applied to grease lubricated bearings. Grease lubricated bearings are running under starved lubrication conditions, in contrast to oil lubricated bearings which are running under fully flooded lubrication conditions.

It is possible to measure the oil film thickness based on a measured electrical capacitance of the bearing. However, in this method, it is assumed that the bearing is running under fully flooded conditions, also for grease lubricated bearings, which is essentially wrong and leads to an error in the final result. The grease film thickness (that is measured with the conventional method under the wrong assumption of a fully flooded bearing) is too high and the films are thinner in reality.

It is therefore object of the present invention to provide a method and system for monitoring the thickness of a lubricant film, in particular a grease film, within a bearing with greater accuracy.

SUMMARY OF THE INVENTION

This object is solved by a monitoring method for monitoring the film thickness of a lubricant within a lubricated bearing according to claim 1 as well as a monitoring system for monitoring the film thickness of a lubricant within a lubricated bearing.

The disclosed monitoring method may be used for monitoring the film thickness of a lubricant, in particular grease, within a lubricated bearing. Such a bearing may comprise an inner ring, an outer ring and rolling elements being arranged between the inner ring and the outer ring, which will be exemplary described in the following. However, the method may be used for any kind of bearing, e.g., plain bearings or linear bearings, which comprise any kind of lubricant. The bearing may be lubricated using grease or oil, but also refrigerant or any other kind of lubricant.

In contrast to existing approaches, the disclosed monitoring method may be particularly used for (e.g., grease) lubricated bearings, which are running under starved conditions, but also for oil lubricated bearing, which, at high speeds, are also running under starved conditions, or bearings having a very thin layer of lubricant. As explained above, the existing approaches assume a fully flooded bearing which may lead to wrong results when the bearing is not fully flooded. In the disclosed monitoring method, this may be avoided by determining at the beginning whether the bearing is running fully flooded or starved.

Therefore, the monitoring method comprises a capacitance measuring step for measuring the total capacitance of the bearing.

A possibility how to measure the total capacitance of the bearing is described in the following with reference to a ball bearing. However, a similar calculation may be used for any kind of bearing. When a ball bearing is axially loaded, and the inner and outer rings are electrically connected, the following condition arises: Since all the balls are loaded equally, the film thicknesses at all the ball-ring contact interfaces are uniform. These ball-ring interfaces (between the inner ring and ball, and between the outer ring and ball) can be considered as parallel plate capacitors, connected in series.

For a parallel plate capacitor, the capacitance is given by $$C = \frac{\varepsilon_0 \varepsilon_{oil} A}{h} \quad (1)$$

where $\varepsilon_0$ is the permittivity constant, $\varepsilon_{oil}$ is the dielectric constant of the dielectric material (here lubricant oil, applies to grease analogously), A is the area of the capacitor plate and h is the distance between the parallel plates (that means the distance between the ball and the ring which corresponds to the film thickness).

The total capacitance of the bearing is not only dependent on the Hertzian contact region, i.e., the region where the lubricant film between ring and balls is (almost) uniform, but also includes the capacitance dependent on the outside regions, i.e., regions without direct contact, and some background capacitance. Mathematically, for one ball, the capacity between ball and inner ring is $$C_i = C_{i,Hertz} + C_{i,outside} \quad (2)$$

and the capacity between ball and outer ring is $$C_o = C_{o,Hertz} + C_{o,outside} \quad (3)$$

where the subscripts Hertz and outside indicate Hertzian and outside capacitances, respectively. For n number of balls, the inner ring capacity is defined as $$C_{inner} = nC_i \quad (4)$$

and the outer ring capacity is $$C_{outer} = nC_o \quad (5)$$

Since inner and outer ring capacitance are in series, the equivalent/total capacitance of the bearing is given by $$C_{total} = \frac{1}{\frac{1}{C_{inner}} + \frac{1}{C_{outer}}} + C_{background} \quad (6)$$

where $C_{background}$ is the capacitance of a used test rig itself which can be assumed to be constant. Thus, by measuring the inner ring capacity $C_{inner}$ and the outer ring capacity $C_{outer}$ as well as the background capacity $C_{background}$, the total capacity of the bearing $C_{total}$, may be calculated.

After measuring (and calculating) the capacitance of the bearing, a film thickness of the lubricant may be determined in a first calculation step based on the measured capacitance of the bearing. Further, it may be determined whether the lubrication condition is fully flooded or starved. This step is in particular important as it may ensure that no wrong assumption is made regarding the bearing condition which would lead to a wrong assessment of the film thickness as explained above.

The film thickness, for example in a ball/roller—ring contact, is given by the geometry (contact radii), by the speed and by the viscosity of the lubricant. The available volume does not play a role as long as there is enough of it. More oil will not give thicker films in the case of fully flooded contacts. This applies down to a certain critical value, below which the film thickness will be a function of the position of the contact inlet meniscus. The latter mode of lubrication is called 'starved lubrication'.

Due to starvation, the oil in the inlet region is less (in contrast to a fully flooded condition), resulting in lower outside capacitance (this is valid for oil lubricated bearings as well as for grease lubricated bearings in which the grease separates into oil and thickeners during operation, i.e., the oil bleeds, which also leads to less oil in the inlet region). Hence, the relationship between film thickness and capacitance will be different for fully flooded and for starved lubrication conditions.

In this context, inlet region refers to the region for the ball in rolling direction and outlet region refers to the region behind the ball in rolling direction. As described, grease releases oil for lubrication. Thus, in the inlet as well as the contact region there will be an oil layer separating the ball and the ring. Over time, the bearing will show a starved lubrication condition, which means that there will be a mixture of oil and air in the outlet region, directly after the ball, also called cavitation. The inlet region will separate in two different regions, a region directly before the ball, being defined by the distance between the contact between ball and ring and the meniscus position of the lubricant where the gap is fully filled with lubricant. Further away, before the meniscus, the inlet gap is filled with air.

Thus, when it is determined that the bearing is starved, the film thickness is determined in the first calculations step, whereas, when the bearing is determined to be fully flooded, the, a second calculation step may follow during which the film thickness determined in the first calculation step may be corrected. Preferably, for both lubrication conditions, i.e., starved and fully flooded, an iterative process may be used for determining the actual film thickness. In the first calculation step for determining the film thickness under starved condition, the iterative process may include adapting the inlet meniscus position. In the second calculation step for determining the film thickness under fully flooded condition, the iterative process may include adapting the film thickness of the inner ring. Both calculation steps will be described in the following in greater detail.

According to an embodiment, the first calculation step includes assuming a meniscus position, calculating a starved film thickness of the lubricant based on the assumed meniscus position and the measured capacitance and calculating a total capacitance of the bearing using the assumed meniscus position and the starved film thickness of the lubricant.

During this step, a meniscus position is assumed in order to be able to calculate the starved film thickness as well as the total capacitance. However, the meniscus position or distance could also be assumed wrongly, thus, the first calculation step preferably comprises a determination step for comparing the measured capacitance and the calculated capacitance, and, if the difference between the measured capacitance and the calculated capacitance is below a set threshold, for determining the assumed meniscus position and the calculated starved film thickness of the lubricant as the actual meniscus position and the actual starved film thickness of the lubricant.

Thus, if the difference between the measured capacitance and the calculated capacitance is below the set threshold, the assumptions and calculations are considered to be correct, and the method may be end. Of course, the method may be repeated and start again from the beginning to be able to provide a continuous monitoring of the lubricant condition.

The method may thus provide a lubrication condition monitoring which is reliable for fully flooded as well as for starved lubrication conditions as the method differs between these two conditions. Further, the method may thus be used for oil and for grease lubricated bearings.

In a further embodiment, when the determination steps determines that the difference between the measured capacitance and the calculated capacitance is above the set threshold, the method returns to the first calculation step for adopting the assumed meniscus position and for re-calculating the starved film thickness of the lubricant based on the adopted meniscus position and the measured capacitance and for re-calculating the total capacitance of the bearing using the adopted meniscus position and the re-calculated starved film thickness of the lubricant. The second calculation step and the determination step may be repeated until the difference between the measured capacitance and the calculated capacitance is below the set threshold.

Thus, the method may comprise several iterative loops for assuming the meniscus position correctly. After that, the method may start at the beginning, i.e., with the capacitance measuring step, for providing a continuously monitoring of the bearing's lubrication condition. Alternatively, the method may be repeated periodically, i.e., for monitoring or checking the lubrication condition in selected intervals.

According to a further embodiment, calculating a starved film thickness of the lubricant based on the assumed meniscus position and the measured capacitance of the first calculation step comprises calculating a starved film thickness of the inner ring based on the assumed meniscus position and the measured capacitance, calculating a starved film thickness of the outer ring based on a relation between the film thickness of the inner ring to the film thickness of the outer ring and calculating the total capacitance of the bearing using the assumed meniscus position and the starved film thickness of the inner and the outer ring.

One example for calculating the starved film thickness is described in the following. It should be noted that also other approaches and theories may be used as long as resulting in a starved film thickness as herein described.

The equation used to calculate the film thickness $h_{st}$ as a function of the meniscus position, also called inlet distance, is from Hamrock and Dowson (Hamrock, B. J., and Dowson, D., 1977. Isothermal elastohydrodynamic lubrication of point contacts: Part iv—starvation results". J. Trib), and reads $$h_{st} = H_{ff} R_x \left( \frac{m-1}{m^*-1} \right)^{0.29} \quad (7)$$

where m=x/b is the dimensionless inlet meniscus distance, x is the meniscus position, and b is the half contact width in x direction; m* is the limit of the dimensionless meniscus distance beyond which fully flooded film thickness occurs, obtained from $$m^* = 1 + 3.06 \left[ \left( \frac{R_x}{b} \right)^2 H_{ff} \right]^{0.58} \quad (8)$$

where $H_{ff} = h_{ff}/R_x$ is the dimensionless fully flooded film thickness calculated using equation (9) according to Hamrock and Dowson, where $h_c$ is the central film thickness (also subsequently re-written as $h_{ff}$ where ff stands for "fully flooded"), $R_x$ is the reduced radius in x direction, U is a dimensionless speed parameter, G is a dimensionless material parameter, W is a dimensionless load parameter, $k_d$ is an ellipticity parameter:

$$\frac{h_c}{R_x} = 2.69 U^{0.67} G^{0.53} W^{-0.067} \left( 1 - e^{-0.73 k_d} \right) \quad (9)$$

The dimensionless meniscus position m will be calculated using an iterative approach. The central film thicknesses for the inner ring $h_{st,i}$ is then obtained from equation (7). The outer ring film thickness $h_{st,o}$ is calculated assuming the film thickness ratio for starved and fully flooded conditions are equal. Using this film thickness and meniscus position, $C_{total}$ is calculated using equation (6).

When the contact runs starved, it is assumed that the region outside the running track is still completely filled with oil. The inlet side of the track behind the meniscus is also assumed to be completely filled with oil. The gap between the ball and ring up to the meniscus is filled with air and a layer of oil. The gap between the ball and ring at the outlet across the track is also filled with air and a layer of oil. As mentioned previously, it is assumed that the central lubricant film splits into two equal halves, neglecting the effect of decompression at the outlet. The same dielectric constant of the oil is used for the Hertzian region (pressurized region) and the outside region (depressurized region).

The iterative process to find the inlet meniscus position for calculating the starved central film thickness is:

Assume m=1.

Calculate the inner ring starved film thickness $h_{st,i}$ using equation (7).

Assuming that the ratio of outer and inner ring film thicknesses during starvation is equal to that under fully flooded conditions $$h' = \frac{h_{c,o}}{h_{c,i}} = \left[ \frac{R_o(R_i + R_b)}{R_i(R_o - R_b)} \right]^{0.476} \left( \frac{\eta_{T_o}}{\eta_{T_i}} \right)^{0.67} \quad (10)$$

where $R_i$ and $R_o$ are inner and outer ring radius, $R_b$ is the ball radius, $\eta_{T_o}$ and $\eta_{T_i}$ are the viscosities of the oil at the inner and outer rings; and calculate the outer ring film thickness $h_{st,o}$.

Using the dimensionless meniscus position and the film thicknesses, and calculating $C_{total}$.

Compare the measured $C_{total,meas}$ and calculated $C_{total}$.

If it is determined that the difference is below a set threshold, i.e., when the difference is sufficiently small, the iteration is stopped and the calculated film thicknesses $h_{st,i}$ and $h_{st,o}$ are considered to be the actual film thicknesses.

If the difference is not sufficiently small (e.g. less than 1% difference), the first calculation step may comprise comparing the actually assumed meniscus position m with the fully flooded meniscus position m* beyond which the film thickness corresponds to a fully flooded film thickness. The lubrication condition is determined to be fully flooded when the actually assumed meniscus position is greater or equal to the fully flooded meniscus position, and to be starved when the actually assumed meniscus position is smaller than the fully flooded meniscus position. Thus, in this step it may be checked if the contact is starved or fully flooded by comparing m and m*. When m≥m*, the contact is fully flooded, else it is starved. For starved conditions, the process as described above is repeated by slightly increasing the meniscus position.

When it is determined that the bearing ins under fully flooded conditions, the method continues with the second calculation step as mentioned above and described below in greater detail.

According to an embodiment, the second calculation step comprises assuming a fully flooded film thickness of the inner ring based on the calculated film thickness of the inner ring of the first calculation step, calculating a fully flooded film thickness of the outer ring based on a relation between the film thickness of the inner ring to the film thickness of the outer ring and calculating the total capacitance of the bearing using the film thickness of the inner and the outer ring. The calculation of the film thicknesses as well as of the capacitance corresponds to the calculations as described with reference to the first calculation step, with the exception that the second calculation step does not start with assuming a meniscus position but with increasing the film thickness of the inner ring as calcuclated in the first calculation step.

According to a further embodiment, similar to the first calculation step, the second calculation step comprises a determination step for comparing the measured capacitance and the calculated capacitance, and, if the difference between the measured capacitance and the calculated capacitance is below a set threshold, for determining the calculated fully flooded film thickness of the lubricant as the actual fully flooded film thickness of the lubricant.

If the difference between the measured capacitance and the calculated capacitance is above the set threshold, the method returns to the start of the second calculation step for adopting the assumed fully flooded film thickness of the inner ring, for re-calculating the fully flooded film thickness of the outer ring based on a relation between the film thickness of the inner ring to the film thickness of the outer ring and for re-calculating the total capacitance of the bearing using the film thickness of the inner and the outer ring.

The second calculation step including the determination step may be repeated until the difference between the measured capacitance and the calculated capacitance is below the set threshold.

Thus, the first and the second calculation step are iterative processes, which use a measured and a calculated capacitance for determining the film thickness either under starved or under fully flooded conditions. No additional measurements are needed, as both calculations are based on the measured capacitance.

One possible process of the second calculation step is described in the following. As also described above, in grease lubrication, the film thickness could be greater than the fully flooded base oil film thickness. This is caused by a higher viscosity of the grease than its base oil, generally observed at low shear rates, hence at very low bearing speeds. In this case, the area around the contact excluding the outlet region is considered to be filled with oil. At the outlet region the space between the ball and ring across the track is considered entirely filled with a layer of oil and air. The total capacitance is only a function of central film thickness. Thus, in the second calculation step, $H_{ff}$ is varied in equation (7) until the calculated total capacitance $C_{total,calc}$ matches the measured capacitance $C_{total,meas}$. The iterative process to find the fully flooded film thickness is:

Increase the $H_{ff,i}$ in equation (7).

Use equation (10) to calculate the outer ring film thickness $h_{ff,o}$.

Use these film thicknesses to calculate the total capacitance $C_{total}$.

Compare the measured capacitance $C_{total,meas}$ and the calculated capacitance $C_{total}$. If the difference is sufficiently small (less than 1% difference), the calculated film thickness is assumed to be correct. If not, slightly increase $H_{ff,i}$ and repeat the process.

According to a further embodiment, the first calculation step comprises determining a dielectric constant of a base oil within the lubricated bearing and using the determined dielectric constant for determining the film thickness of the lubricant.

According to this embodiment, the dielectric constant of the bled oil for each desired load in the fully flooded condition may be determined before the determination of the film thickness. For this, an electrical model in combination with a capacitance measurement for a fully flooded test bearing lubricated with base oil may be used for determining the dielectric constant as follows:

Measure the background capacitance using a test bearing (e.g., a hybrid bearing with ceramic rolling balls/rollers)

Measure the capacitance and temperature in the test bearing using the base oil at a particular load and speed (for example, for a 6209 bearing, 513 N and 400 rpm).

Calculate the fully flooded inner ring film thickness $h_{ff,i}$ and outer ring film thickness $h_{ff,o}$ using the Hamrock and Dowson film thickness equation (equation (9) with viscosity estimated from the measured outer ring temperature). Then substitute these into the capacity-film thickness equations for the outside and the Hertzian regions (11), (12), (13):

$$C_{outside} = C_{flooded} + C_{cav} \quad (11)$$

where $C_{flooded}$ and $C_{cav}$ are the flooded region capacitance and the cavitated region capacitance, respectively, given by $$C_{flooded} = \iint_{A_{flooded}} \frac{\varepsilon_0 \varepsilon_{oil} dxdy}{h_c + h_{gap}(x,y)} \quad (12)$$

$$C_{cav} = \iint_{A_{cav}} \frac{\varepsilon_0 dxdy}{\frac{h_c}{\varepsilon_{oil}} + h_{gap}(x,y)\frac{1}{\varepsilon_{air}}} \quad (13)$$

where $A_{flooded}$ is the flooded region, $A_{cav}$ is the cavitated region, $h_{gap}$ is the gap between the ball and ring, $\varepsilon_0$ is the permittivity constant, $\varepsilon_{oil}$ is the dielectric constant of oil, and $\varepsilon_{air}$ is the dielectric constant of air.

Substitute the measured total capacitance $C_{total,meas}$ from step 2) in equation (14), and rearrange to solve for the dielectric constant $\varepsilon_{oil}$:

$$C_{total} = \frac{1}{\frac{1}{n\left(\varepsilon_0\varepsilon_{oil}\frac{A_{i,Hertz}}{h_{c,i}} + c_{i,outside}\right)} + \frac{1}{n\left(\varepsilon_0\varepsilon_{oil}\frac{A_{o,Hertz}}{h_{c,i}h'} + c_{o,outside}\right)}} + C_{background} \quad (14)$$

where $h' = h_{c,o}/h_{c,i}$; $A_{i,Hertz}$ and $A_{o,Hertz}$ are the Hertzian contact area on the inner ring and outer ring; $C_{i,outside}$ and $C_{o,outside}$ are outside capacitances of the ball-inner ring and ball-outer ring contacts. The dielectric constant $\varepsilon_{oil}$ may then be used for the determination of the film thickness as described above.

According to a further aspect, a monitoring system for monitoring the film thickness of a lubricant within a lubricated bearing is disclosed. The monitoring system comprises a capacitance measuring unit for measuring the total capacitance of the bearing, a first calculation unit for a first calculation unit for determining a film thickness of the lubricant based on the measured capacitance of the bearing and for determining whether the lubrication condition is fully flooded or starved, and when the lubrication condition is fully flooded, a second calculation unit for correcting the film thickness determined in the first calculation step.

The features and embodiments described above regarding the monitoring method also apply to the monitoring system.

An even further aspect of the present invention relates to a computer program product comprising a computer program code which is adapted to prompt a control unit, e.g., a computer, and/or a computer of the above discussed monitoring system to perform the above discussed steps.

The computer program product may be a provided as memory device, such as a memory card, USB stick, CD-ROM, DVD and/or may be a file which may be downloaded from a server, particularly a remote server, in a network. The network may be a wireless communication network for transferring the file with the computer program product.

Further preferred embodiments are defined in the dependent claims as well as in the description and the figures. Thereby, elements described or shown in combination with other elements may be present alone or in combination with other elements without departing from the scope of protection.

In the following, preferred embodiments of the invention are described in relation to the drawings, wherein the drawings are exemplarily only, and are not intended to limit the scope of protection. The scope of protection is defined by the accompanied claims, only.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The figures show.

In the following same or similar functioning elements are indicated with the same reference numerals.

DETAILED DESCRIPTION OF THE EMBODIMENTS

Figure 1:
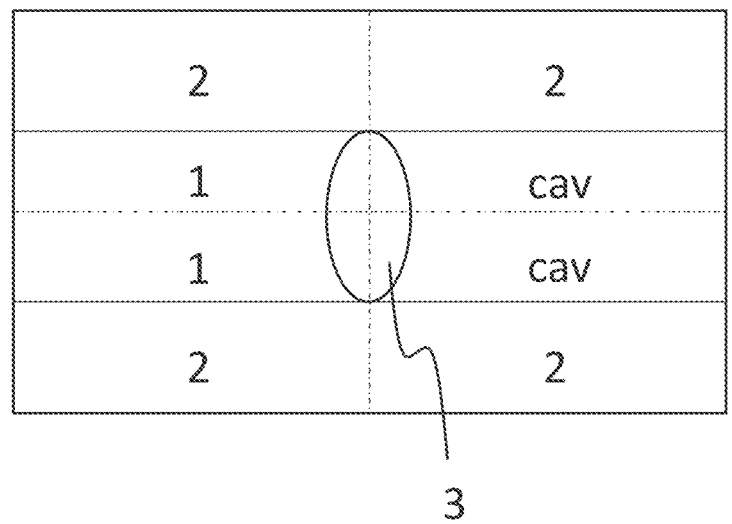
FIG. 1: a schematic diagram of different regions in a bearing within the ball-ring-contact area in fully flooded condition.
Figure 2:
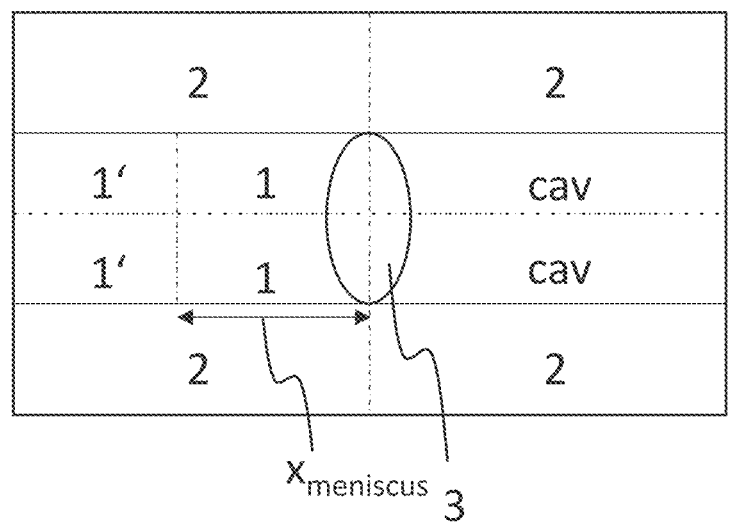
FIG. 2: a schematic diagram of different regions in a bearing within the ball-ring-contact area in starved condition.

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. FIG. 1: shows a schematic.

As can be seen, there is an inlet region 1 being part of the track where a ball is running, an outside region 2, i.e., a region without contact to a ball, a direct contact region 3, i.e., the region where there is a current contact between ball and ring, and a cavitated region cav. In the inlet region 1, when the bearing is fully flooded, which means that there is no separation between oil and thickeners of a grease, the lubricant is filling the bearing completely, also the inlet region 1. This condition normally occurs at the start of operation. The cavitated region cav is filled with a mixture of oil and air.

After some time, the grease starts to separate into oil and thickeners, wherein the oil is needed for lubricating the bearing. In this state, the inlet region has an area 1, in which there is oil for lubricating the bearing, in particular in the direct contact region 3. But the inlet region has also an area 1' in which there is no oil or at least only a mixture of oil and air, like in the cavitated region cav.

In order to ensure a proper operation of a bearing, the film thickness of the lubricant needs to be monitored. As explained above, when the lubricant deteriorates and the film thickness is getting too low, the rolling elements, for example balls and raceways of the bearing may be damaged. Thus, it is crucial for a long service life of the bearing to replace a lubricant in due time.

For oil lubricated bearings being fully flooded, there exist some approaches based on a capacitance measurement. However, for grease lubricated bearings or oil lubricated bearings in a starved condition, i.e., in a condition where cavitated regions exist, it was not possible until now to calculate the film thickness easily based on a capacitance measurement.

Figure 3:
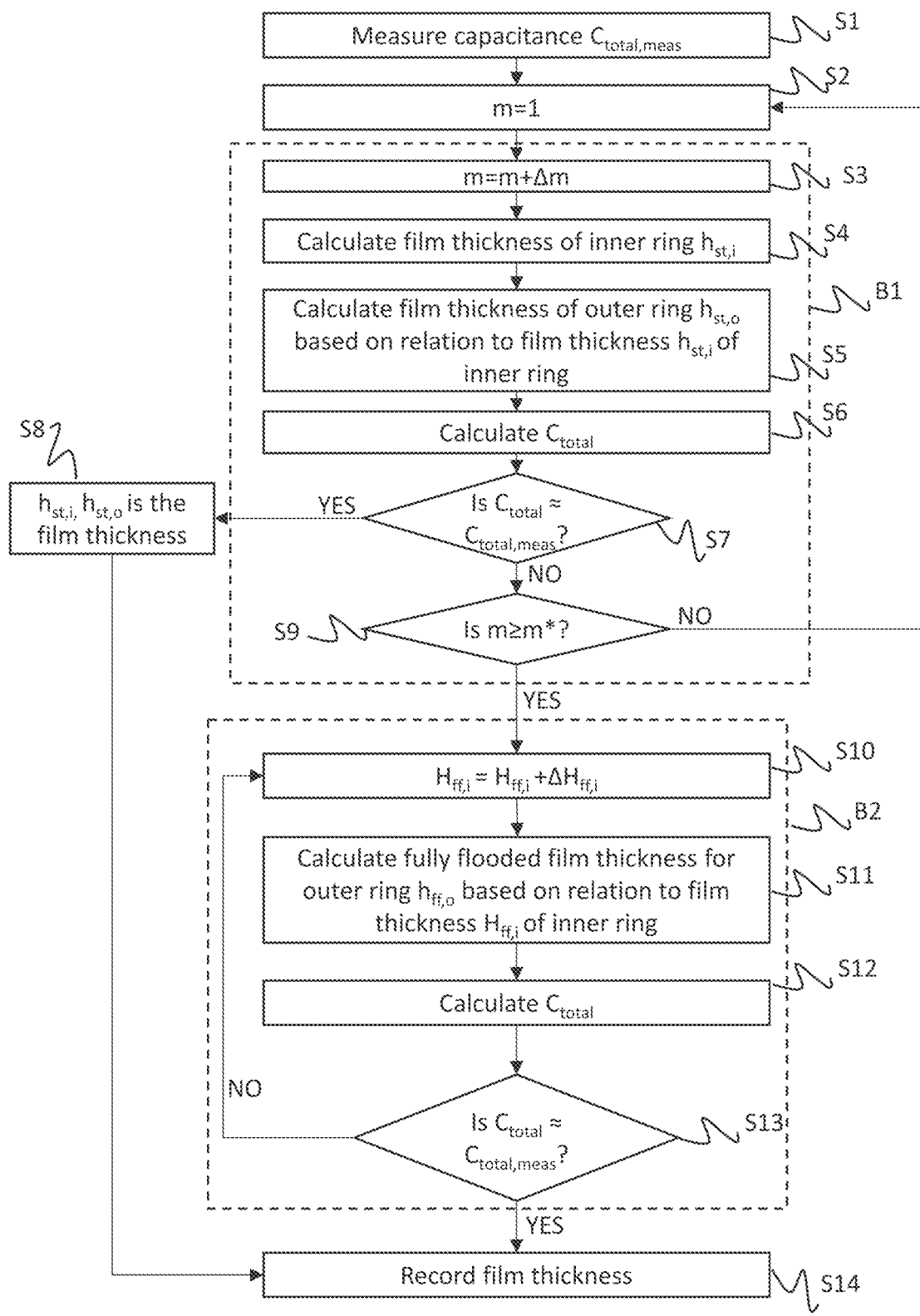
FIG. 3: a flow diagram of a monitoring method for monitoring the lubrication condition within the bearing of FIGS. 1 and 2.
Figure 4:
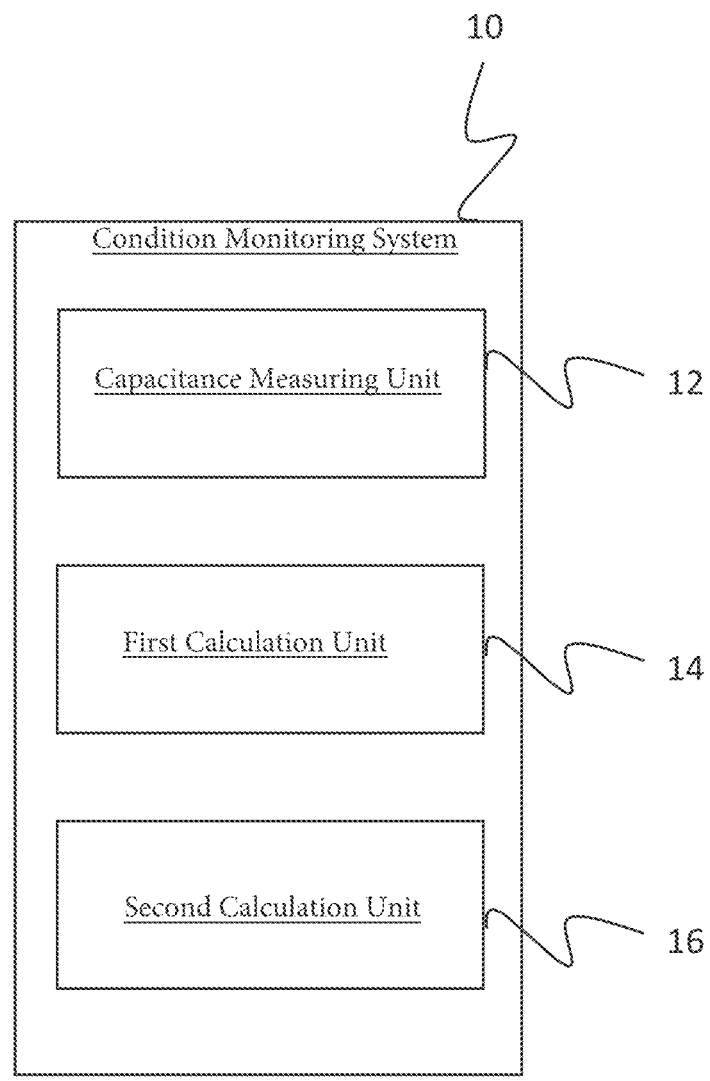
FIG. 4: a monitoring system for executing the monitoring method of FIG. 3.

In the following with reference to FIG. 3, a monitoring method for monitoring the film thickness of a lubricant, either oil or grease, will be described. It should be noted that, although the steps of the method are shown in a specific order, some of the steps could also be exchanged or could take place at the same time. Further, some of the steps could also be omitted also be replaced by other steps. A corresponding monitoring system 10, which may be used for executing the monitoring method of FIG. 3, is shown in FIG. 4.

The monitoring system 10 may comprise a capacitance measuring unit 12, a first calculation unit 14 and a second calculation unit 16.

For the monitoring of a lubricant film thickness of a bearing, the method starts with step S1 and measures a capacitance $C_{total,meas}$ of the bearing (for example via the capacitance measuring unit 12 of the monitoring system 10). Subsequently, in step S2, a meniscus position m=1 is assumed for starting the following iterative process.

In block B1 including steps S3-S9, it is determined whether the bearing is in a starved of fully flooded condition and when in starved condition, the film thickness is determined. Otherwise, the film thickness under fully flooded condition is determined in block B2 including steps S10-13. The steps of block B1 may be carried out for example by the first calculation unit 14 and the steps of block B2 may be carried out by the second calculation unit 16.

First, the method starts with step S3 in block B1 (first calculation step) and adopts the meniscus length by Δm.

In step S4, the inner ring starved film thickness $h_{st,i}$ is calculated as described above. In step S5, the ratio of outer and inner ring film thickness during starvation is used for calculating the outer ring film thickness $h_{st,o}$ in step S5.

After that, the total capacitance $C_{total}$ of the bearing is calculated in step S6 using the assumed meniscus position and the calculated film thickness. Then, $C_{total}$ may be compared with $C_{total,meas}$ in step S7. If the difference is within an acceptable range or below a preset threshold (e.g., less than 1% difference), then the assumed meniscus position is correct, and the calculated film thickness is the starved grease film thickness (S8). In this case, the method proceeds to step S14 and records the film thickness. After that, the method may start from the beginning at step S1 for a continuous monitoring of the film thickness.

If it is determined in step S7, that the difference is not within the acceptable range, the method compares in step S9 whether m≥m*. If this is not the case, the bearing is considered to be under starved condition and the method proceeds with the iterative process at step S3 for determining the starved lubricant film thickness.

If it is determined in step S9, that m<m*, the bearing is considered to be under fully flooded conditions and the method continues with step S10 in block B2 for determining the fully flooded lubricant film thickness. Block B2 (second calculations step) also comprises an iterative process, but here not the meniscus position is assumed and adopted, but the film thickness of the inner ring.

In step S10, the film thickness $H_{ff,i}$ of the inner ring is adopted by Similar to the first block B1, the ratio of outer and inner ring film thickness is used for calculating the outer ring film thickness $h_{ff,o}$ in step S11.

After that, the total capacitance $C_{total}$ of the bearing is calculated in step S12 using the calculated film thicknesses.

Then, $C_{total}$ may be compared with $C_{total,meas}$ in step S13. If the difference is within an acceptable range or below a preset threshold (e.g., less than 1% difference), then the assumed inner ring film thickness $H_{ff,i}$ is correct, and the calculated film thickness is the fully flooded grease film thickness. In this case, the method proceeds to step S14 and records the film thickness. After that, the method may start from the beginning at step S1 for a continuous monitoring of the film thickness.

If it is determined in step S13, that the difference is not within the acceptable range, the method proceeds with the iterative process at step S10 for determining the fully flooded lubricant film thickness by adopting $H_{ff,i}$.

Thus, the herein described monitoring method provides a possibility to reliably monitor the film thickness of a lubricant within a bearing based on a capacitance measurement. In contrast to previous approaches, this monitoring method may be used for oil and/or grease lubricated bearings independent whether the bearing is in fully flooded or starved condition. Moreover, the method may also determine the bearing condition, i.e., whether the bearing is in fully flooded or starved condition.

The invention claimed is:

1. A monitoring method for monitoring a film thickness of a lubricant within a lubricated bearing, the bearing having an inner ring, an outer ring and a plurality of rolling elements arranged between the inner ring and the outer ring, the method comprising:
    a capacitance measuring step (S1) for measuring the total capacitance of the bearing,
    a first calculation step (B1) for determining a film thickness of the lubricant based on the measured capacitance of the bearing and for determining whether the lubrication condition is fully flooded or starved, and wherein
    when the lubrication condition is fully flooded, a second calculation step (B2) for correcting the film thickness determined in the first calculation step.

2. The monitoring method according to claim 1, wherein the first calculation step (B1) comprises assuming a meniscus position, calculating a starved film thickness of the lubricant based on the assumed meniscus position and the measured capacitance and calculating a total capacitance of the bearing using the assumed meniscus position and the starved film thickness of the lubricant.

3. The monitoring method according to claim 2, wherein the first calculation step (B1) comprises a determination step for comparing the measured capacitance and the calculated capacitance, and, if the difference between the measured capacitance and the calculated capacitance is below a set threshold, for determining the assumed meniscus position and the calculated starved film thickness of the lubricant as the actual meniscus position and the actual starved film thickness of the lubricant.

4. The monitoring method according to claim 3, wherein, if the difference between the measured capacitance and the calculated capacitance is above the set threshold, the method returns to the first calculation step (B1) for adopting the assumed meniscus position and for re-calculating the starved film thickness of the lubricant based on the adopted meniscus position and the measured capacitance and for re-calculating the total capacitance of the bearing using the adopted meniscus position and the re-calculated starved film thickness of the lubricant.

5. The monitoring method according to claim 2, wherein calculating a starved film thickness of the lubricant based on the assumed meniscus position and the measured capacitance of the first calculation step comprises calculating a starved film thickness of the inner ring based on the assumed meniscus position and the measured capacitance, calculating a starved film thickness of the outer ring based on a relation between the film thickness of the inner ring to the film thickness of the outer ring and calculating the total capacitance of the bearing using the assumed meniscus position and the starved film thickness of the inner and the outer ring.

6. The monitoring method according to claim 2, wherein the first calculation step (B1) including the determination step is repeated until the difference between the measured capacitance and the calculated capacitance is below the set threshold.

7. The monitoring method according to claim 1, wherein the first calculation step (B1) comprises comparing an actually assumed meniscus position with a fully flooded meniscus position beyond which the film thickness corresponds to a fully flooded film thickness, wherein the lubrication condition is determined to be fully flooded when the actually assumed meniscus position is greater or equal to the fully flooded meniscus position, and to be starved when the actually assumed meniscus position is smaller than the fully flooded meniscus position.

8. The monitoring method according to claim 1, wherein the first calculation step (B1) comprises determining a dielectric constant of a base oil within the lubricated bearing and using the determined dielectric constant for determining the film thickness of the lubricant.

9. The monitoring method according to claim 1, wherein the second calculation step (B2) comprises assuming a fully flooded film thickness of the inner ring based on the calculated film thickness of the inner ring of the first calculation step (B1), calculating a fully flooded film thickness of the outer ring based on a relation between the film thickness of the inner ring to the film thickness of the outer ring and calculating the total capacitance of the bearing using the film thickness of the inner and the outer ring.

10. The monitoring method according to claim 9, wherein the second calculation step (B2) comprises a determination step for comparing the measured capacitance and the calculated capacitance, and, if the difference between the measured capacitance and the calculated capacitance is below a set threshold, for determining the calculated fully flooded film thickness of the lubricant as the actual fully flooded film thickness of the lubricant.

11. The monitoring method according to claim 10, wherein, if the difference between the measured capacitance and the calculated capacitance is above the set threshold, the method returns to the start of the second calculation step (B2) for adopting the assumed fully flooded film thickness of the inner ring, for re-calculating the fully flooded film thickness of the outer ring based on a relation between the film thickness of the inner ring to the film thickness of the outer ring and for re-calculating the total capacitance of the bearing using the film thickness of the inner and the outer ring.

12. The monitoring method according to claim 11, wherein the second calculation step (B2) including the determination step is repeated until the difference between the measured capacitance and the calculated capacitance is below the set threshold.

* * * * *